United States Patent
Ni et al.

(10) Patent No.: US 9,281,119 B2
(45) Date of Patent: Mar. 8, 2016

(54) THREE-COIL TOPOLOGY FOR WIRELESS POWER TRANSFER

(71) Applicant: The Hong Kong Polytechnic University, Hong Kong (HK)

(72) Inventors: Bailian Ni, Hong Kong (HK); Chi-yung Chung, Hong Kong (HK); Hon-lung Chan, Hong Kong (HK)

(73) Assignee: The Hong Kong Polytechnic University, Hunghom, Kowloon (HK)

( * ) Notice: Subject to any disclaimer, the term of this patent is extended or adjusted under 35 U.S.C. 154(b) by 162 days.

(21) Appl. No.: 14/079,577

(22) Filed: Nov. 13, 2013

(65) Prior Publication Data

US 2015/0130407 A1    May 14, 2015

(51) Int. Cl.
| | |
|---|---|
| *H02J 7/00* | (2006.01) |
| *H01F 38/14* | (2006.01) |
| *H02J 5/00* | (2006.01) |
| *H02J 7/02* | (2006.01) |

(52) U.S. Cl.
CPC ............... *H01F 38/14* (2013.01); *H02J 5/005* (2013.01); *H02J 7/025* (2013.01)

(58) Field of Classification Search
CPC ............ H01F 38/14; H02J 5/005; H02J 7/025
USPC ........................................................ 320/108
See application file for complete search history.

(56) References Cited

U.S. PATENT DOCUMENTS

| | | | |
|---|---|---|---|
| 4,802,080 A | | 1/1989 | Bossi et al. |
| 8,704,407 B2 * | | 4/2014 | Kozakai .................... 307/104 |
| 2012/0010079 A1 * | | 1/2012 | Sedwick ..................... 505/163 |
| 2014/0159652 A1 * | | 6/2014 | Hall et al. .................. 320/108 |
| 2014/0339923 A1 * | | 11/2014 | Simopoulos et al. ......... 307/149 |

OTHER PUBLICATIONS

Cannon, B.L., Hoburg, J.F., Stancil, D.D., and Goldstein, S.C., "Magnetic resonant coupling as a potential means for wireless power transfer to multiple small receivers," IEEE Transactions on Power Electronics, vol. 24, pp. 1819-1825, Jul. 2009.
Zhong, W., Lee, C.K., and Hui, S.Y.R., "General analysis on the use of Tesla's resonators in domino forms for wireless power transfer," IEEE Transactions on Industrial Electronics, vol. 60, pp. 261-270, Jan. 2013.
Ahn, D., and Hong, S., "A study on magnetic field repeater in wireless power transfer," IEEE Transactions on Industrial Electronics, vol. 60, pp. 360-371, Jan. 2013.
Zhang, X., Ho, S.L., and Fu, W.N., "Quantitative design and analysis of relay resonators in wireless power transfer system," IEEE Transactions on Magnetics, vol. 48, pp. 4026-4029, Nov. 2012.
Kiani, M., Jow, U.-M., and Ghovanloo, M., "Design and optimization of a 3-coil inductive link for efficient wireless power transmission," IEEE Transactions on Biomedical Circuits and Systems, vol. 5, pp. 579-591, Dec. 2011.

* cited by examiner

*Primary Examiner* — Vuthe Siek
(74) *Attorney, Agent, or Firm* — Ella Cheong Hong Kong; Sam T. Yip

(57) ABSTRACT

A system using a three-coil topology for wireless power transfer is disclosed. The system comprises a primary resonator coupled to a power source, a repeater resonator and a receiver resonator. The primary resonator has a primary coil, and the repeater resonator has a repeater coil adjacent to the primary coil. The repeater coil and the primary coil are separated by a distance selected, and the repeater coil is configured, to amplify a primary-coil current by inductively generating a repeater-coil current that is substantially greater than the primary-coil current. A magnetic field contributed from both the primary-coil current and the repeater-coil current is generated while the power source needs not provide a terminal voltage across the repeater coil, thereby discouraging occurrence of voltage stress at the power source. The receiver resonator has a receiver coil, which receives the magnetic field to inductively generate a receiver-coil current for feeding to a load.

16 Claims, 7 Drawing Sheets

TABLE 1. RMS currents in the coils of the three- and of the two-coil topologies (Experiment 2)

| Loading condition | Two-coil topology | | Three-coil topology | | |
|---|---|---|---|---|---|
| | RMS current of primary coil (A) | RMS current of receiver coil (A) | RMS current of primary coil (A) | RMS current of repeater coil (A) | RMS current of receiver coil (A) |
| Light load | 13.12 | 0.46 | 2.74 | 20.62 | 0.72 |
| Medium load | 13.08 | 0.65 | 2.78 | 20.53 | 1.02 |
| Heavy load | 13.50 | 8.88 | 2.90 | 19.32 | 11.19 |

FIG. 5

TABLE 2. Voltage values and power levels measured for the two- and the three-coil topologies (Experiment 3)

| | Two-coil topology | Three-coil topology |
|---|---|---|
| RMS terminal voltage across the primary coil (V) | 114 | 16.3 |
| RMS terminal voltage across the repeater coil (V) | — | 138 |
| RMS terminal voltage across the receiver coil (V) | 70 | 70.3 |
| Power received by the load (W) | 21.86 | 20.79 |

FIG. 6

THREE-COIL TOPOLOGY FOR WIRELESS POWER TRANSFER

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

LIST OF REFERENCES

There follows a list of references that are occasionally cited in the specification. Disclosures of these references are incorporated by reference herein in their entirety.

[1] A. Kurs, A. Karalis, R. Moffatt, J. D. Joannopoulos, P. Fisher and M. Soljačić, "Wireless power transfer via strongly coupled magnetic resonances," *Science Express*, vol. 317. no. 5834, pp. 83-86, 7 Jun. 2007.

[2] C. Zhu, C. Yu, K. Liu and R. Ma, "Research on the topology of wireless energy transfer device," 2008 *IEEE Vehicle Power and Propulsion Conference (VPPC'08)*, pp. 1-5, 3-5 Sep. 2008.

[3] X. Zhang, S. L. Ho and W. N. Fu., "Quantitative analysis of a wireless power transfer cell with planar spiral structures," *IEEE Transactions on Magnetics*, vol. 47, pp. 3200-3203, October 2011.

[4] T. Imura and Y. Hori, "Maximizing air gap and efficiency of magnetic resonant coupling for wireless power transfer using equivalent circuit and Neumann formula," *IEEE Transactions on Industrial Electronics*, vol. 58, pp. 4746-4752, August 2011.

[5] T. C. Beh, T. Imura, M. Kato and Y. Hori, "Basic study of improving efficiency of wireless power transfer via magnetic resonance coupling based on impedance matching," 2010 *IEEE International Symposium on Industrial Electronics (ISIE)*, pp. 2011-2016, 4-7 Jul. 2010.

[6] Z. Pantic and S. Lukic, "Framework and topology for active tuning of parallel compensated receivers in power transfer systems," *IEEE Transactions on Power Electronics*, vol. 27, pp. 4503-4513, November 2012.

[7] J.-U. W. Hsu, A. P. Hu and A. Swain, "A wireless power pickup based on directional tuning control," *IEEE Transactions on Industrial Electronics*, vol. 56, pp. 2771-2781, July 2009.

[8] S. Han and D. D. Wentzloff, "In-phase resonant inductive coupling for multi-layer vertical communication in 3D-ICs," 2012 *IEEE Antennas and Propagation Society International Symposium (APSURSI)*, pp. 1-2, 8-14 Jul. 2012.

[9] D. Ahn and S. Hong, "Effect of coupling between multiple transmitters or multiple receivers on wireless power transfer," *IEEE Transactions on Industrial Electronics*, vol. 60, pp. 2602-2613, July 2013.

[10] B. L. Cannon, J. F. Hoburg, D. D. Stancil and S. C. Goldstein, "Magnetic resonant coupling as a potential means for wireless power transfer to multiple small receivers," *IEEE Transactions on Power Electronics*, vol. 24, pp. 1819-1825, July 2009.

[11] W. Zhong, C. K. Lee and S. Y. R. Hui, "General analysis on the use of Tesla's resonators in domino forms for wireless power transfer," *IEEE Transactions on Industrial Electronics*, vol. 60, pp. 261-270, January 2013.

[12] D. Ahn and S. Hong, "A study on magnetic field repeater in wireless power transfer," *IEEE Transactions on Industrial Electronics*, vol. 60, pp. 360-371, January 2013.

[13] X. Zhang, S. L. Ho and W. N. Fu, "Quantitative design and analysis of relay resonators in wireless power transfer system," *IEEE Transactions on Magnetics*, vol. 48, pp. 4026-4029, November 2012.

[14] M. Kiani, U.-M. Jow and M. Ghovanloo, "Design and optimization of a 3-coil inductive link for efficient wireless power transmission," *IEEE Transactions on Biomedical Circuits and Systems*, vol. 5, pp. 579-591, December 2011.

There follows a patent that is occasionally cited in the specification.

[15] B. J. Bossi and M. A. Eberhart, "Power transfer circuit including a sympathetic resonator," U.S. Pat. No. 4,802,080, issued 31 Jan. 1989.

FIELD OF THE INVENTION

The present invention relates generally to wireless power transfer based on resonant inductive coupling. In particular, the present invention relates to a three-coil topology for wireless power transfer whereby occurrence of voltage stress at a power source is discouraged.

BACKGROUND

Wireless power transfer (WPT) based on resonant inductive coupling is a process of energy transfer between two or even more physically-unconnected objects through electromagnetic induction. Transferring electric power without using power cables is more convenient and safer in some applications. An efficient WPT system can greatly promote advances in portable electronic devices, micro robotics and medical equipment, whose functions are often limited by a need for power. Furthermore, the availability of high-power WPT systems can promote popularity of electric vehicles (EVs) significantly.

The technology of WPT through resonant inductive coupling was first introduced by the MIT in 2007 [1], where self-resonant coils in a strongly coupled regime were used to achieve WPT. Resonant-coupling WPT uses two copper coils tuned to resonate at the same resonant frequency. The coupled-mode theory (CMT) was applied to decouple the resonating coils and then analyze the WPT system.

Since then, the technology of WPT has gone through dynamic evolutions in recent years. In most cases, two-coil systems (each with one transmitter coil and one receiver coil) are used [2]-[4]. The use of lumped equivalent circuits replaces the CMT in analyzing these systems. To raise the delivered power and to improve the transfer efficiency, considerable research has been carried out regarding these systems. Various techniques, including impedance matching, frequency tuning, coupling efficiency improvement and others [5]-[8], have been considered. Finite element analysis (FEA) is usually used for magnetic simulation and coil design. Multi-coil systems with multiple transmitters or multiple receivers have also been introduced [9], [10]. These multi-coil systems are good solutions for wirelessly powering several devices at the same time. In general, a multi-coil system can be equivalently viewed as consisting of a number of two-coil subsystems with mutual coupling among the coils in the multi-coil system.

The two-coil topology works quite well in low-power applications (defined by the Wireless Power Consortium, WPC, as applications with a wireless transfer within 0 W to 5 W). When used in high-power applications such as recharging batteries for EVs, however, the resonant current on the transmitter's resonant tank becomes undesirably high. This undesirably high resonant current requires a high terminal voltage across the resonant tank to sustain. The need for the high terminal voltage requires a power source that provides the terminal voltage to be able to supply a very high output voltage. The need to supply the very high output voltage leads to voltage stress at the power source. The occurrence of voltage stress is particularly undesirable for a WPT system in that a high operating frequency (e.g., 9.9 MHz [1]) is usually used for the power source to excite the transmitter's resonant tank. It is difficult and costly to implement the power source that operates at high frequency as well as needs to provide the very high output voltage.

There is a need in the art for a WPT technique that discourages occurrence of voltage stress at the power source. Such WPT technique is useful not only for high- or medium-power applications but also for low-power ones. The use of a power source requiring an output of only a low voltage may help development of battery-supported WPT systems, for instance. In one scenario, a battery-supported transmitter may be used to urgently recharge a miniaturized battery in a medical implant, such as a cardiac pacemaker, for emergency life saving.

SUMMARY OF THE INVENTION

A first aspect of the present invention is to provide a power-transmitting unit configured to wirelessly transmit power and a WPT system that employs the power-transmitting unit.

The power-transmitting unit comprises an alternating-current (AC) power source, a primary resonator and a repeater resonator. The primary resonator comprises a primary coil, and is electrically coupled to the power source such that a primary-coil current flows through the primary coil when the primary resonator is excited by the power source. The repeater resonator comprises a repeater coil end-to-end adjacent to the primary coil, and is electrically isolated from the power source. In particular, the repeater coil and the primary coil are separated by a distance selected, and the repeater coil is configured, to amplify the primary-coil current by inductively generating a repeater-coil current that flows through the repeater coil and that is substantially greater than the primary-coil current. It follows that the power-transmitting unit is enabled to generate a magnetic field for WPT with contribution from both the primary-coil current and the repeater-coil current while the power source is not required to provide a terminal voltage across the repeater coil to sustain the repeater-coil current, which is a current substantially greater than the primary-coil current. Occurrence of voltage stress at the power source is thereby discouraged.

The WPT system comprises the power-transmitting unit and one or more power-receiving units. Each power-receiving unit comprises a receiver resonator. The receiver resonator comprises a receiver coil. The receiver coil is configured to receive the magnetic field from the power-transmitting unit so as to inductively generate a receiver-coil current that flows through the receiver coil for feeding to a load.

In one option, the power source is configured to provide AC voltage having a frequency in the range from 100 kHz to 1 MHz. Preferably, the repeater coil is positioned such that the selected distance between the repeater coil and the primary coil is at most one third of a distance between the primary coil and the receiver coil.

It is desirable that a transfer efficiency achieved by the WPT system is greater than 85% when the repeater coil and the receiver coil are separated by a distance of 0.6 m. It is also desirable that power transfer at least 180 W is achievable.

Optionally, each power-receiving unit further comprises one or more rectifiers such that AC power provided from the receiver-coil current is rectified to DC power before feeding to the load. The load may be one or more batteries configured to receive the DC power for recharging.

A second aspect of the present invention is to provide a method for wirelessly transmitting power from a transmitting side to a receiving side.

The transmitting side has a primary resonator, a repeater resonator and an AC power source. The primary resonator comprises a primary coil, and the repeater resonator comprises a repeater coil. The receiving side has a receiver resonator comprising a receiver coil. The method comprises positioning the primary coil to be end-to-end adjacent to the repeater coil, and electrically isolating the repeater resonator from the power source. The power source excites the primary resonator to generate a primary-coil current flowing through the primary coil. The method further comprises selecting a distance between the repeater coil and the primary coil such that the primary-coil current inductively generates a repeater-coil current that flows through the repeater coil and that is substantially greater than the primary-coil current. As a result, the transmitting side is enabled to generate a magnetic field with contribution from both the primary-coil current and the repeater-coil current while the power source is not required to provide a terminal voltage across the repeater coil to sustain the repeater-coil current, which is a current substantially greater than the primary-coil current. Thereby, occurrence of voltage stress at the power source is discouraged. According to the disclosed method, the receiver coil receives the magnetic field so as to inductively generate a receiver current that flows through the receiver coil for feeding to a load at the receiving side.

Other aspects of the present invention are disclosed as illustrated by the embodiments hereinafter.

BRIEF DESCRIPTION OF THE DRAWINGS

FIG. 5 contains a table listing the simulated values of RMS currents in the coils of the three- and of the two-coil topologies as obtained in Experiment 2.

FIG. 6 contains another table listing the values of RMS voltages measured at terminals of the coils in the three- and of the two-coil topologies, together with the levels of power absorbed by the load, where the data were obtained in Experiment 3.

DETAILED DESCRIPTION OF THE INVENTION

The present invention is developed based on experiments performed by the Inventors and the insights obtained from the experiments.

A. Experiment 1

Figure 1:
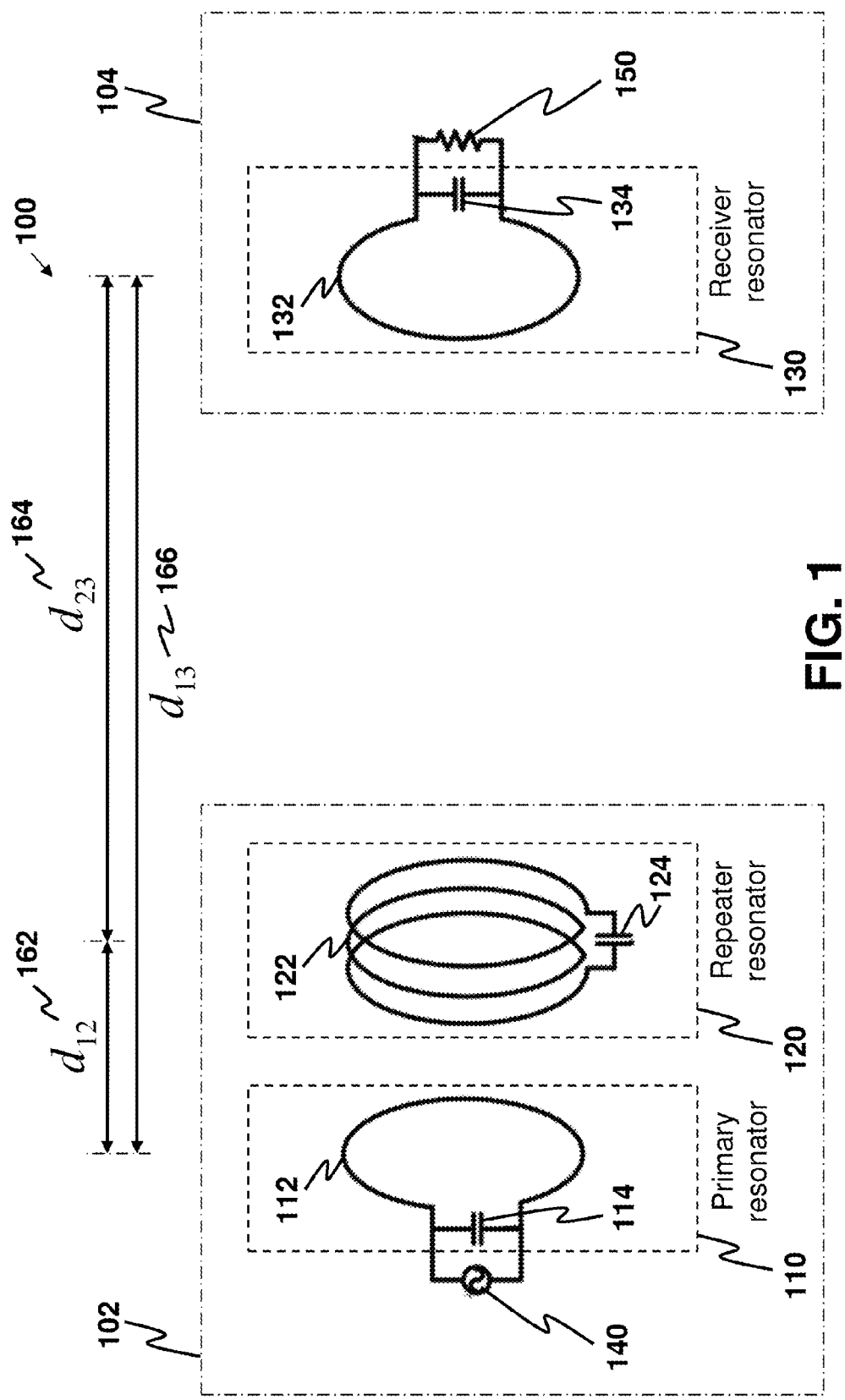
FIG. 1 depicts a WPT system according to an exemplary embodiment of the present invention, the WPT system also being used as a system model in performing Experiment 1.

An experimental investigation on WPT was conducted according to a system model shown in FIG. 1. In particular, a three-coil topology for the system model instead of a two-coil one was considered.

In the system model under consideration, an AC power source 140 generates high-frequency AC power for exciting a primary resonator 110. The primary resonator comprises a primary coil 112 and a first resonant capacitor 114 connected in parallel. A repeater resonator 120, comprising a repeater coil 122 and a second resonant capacitor 124, is positioned in proximity to the primary resonator 110 and is isolated from the primary resonator 110 and the power source 140. The power source 140, the primary resonator 110 and the repeater resonator 120 constitute a transmitter 102. The power sent from the transmitter 102 is wirelessly received by a receiver 104 having a receiver resonator 130. The receiver resonator 130 has a receiver coil 132 and a third resonant capacitor 134 connected in parallel. It is desired that the receiver coil 132 is magnetically coupled to the repeater coil 122 and possibly furthermore to the primary coil 112 in order to inductively generate a current and a voltage across the receiver coil 132 for feeding to a load 150. The distance between the primary coil 112 and the repeater coil 122 is $d_{12}$ 162, and the distance between the repeater coil 122 and the receiver coil 132 is $d_{23}$ 164. Note that $d_{13}$ 166, given by $d_{13}=d_{12}+d_{23}$, is the distance between the primary coil 112 and the receiver coil 132.

Figure 2:
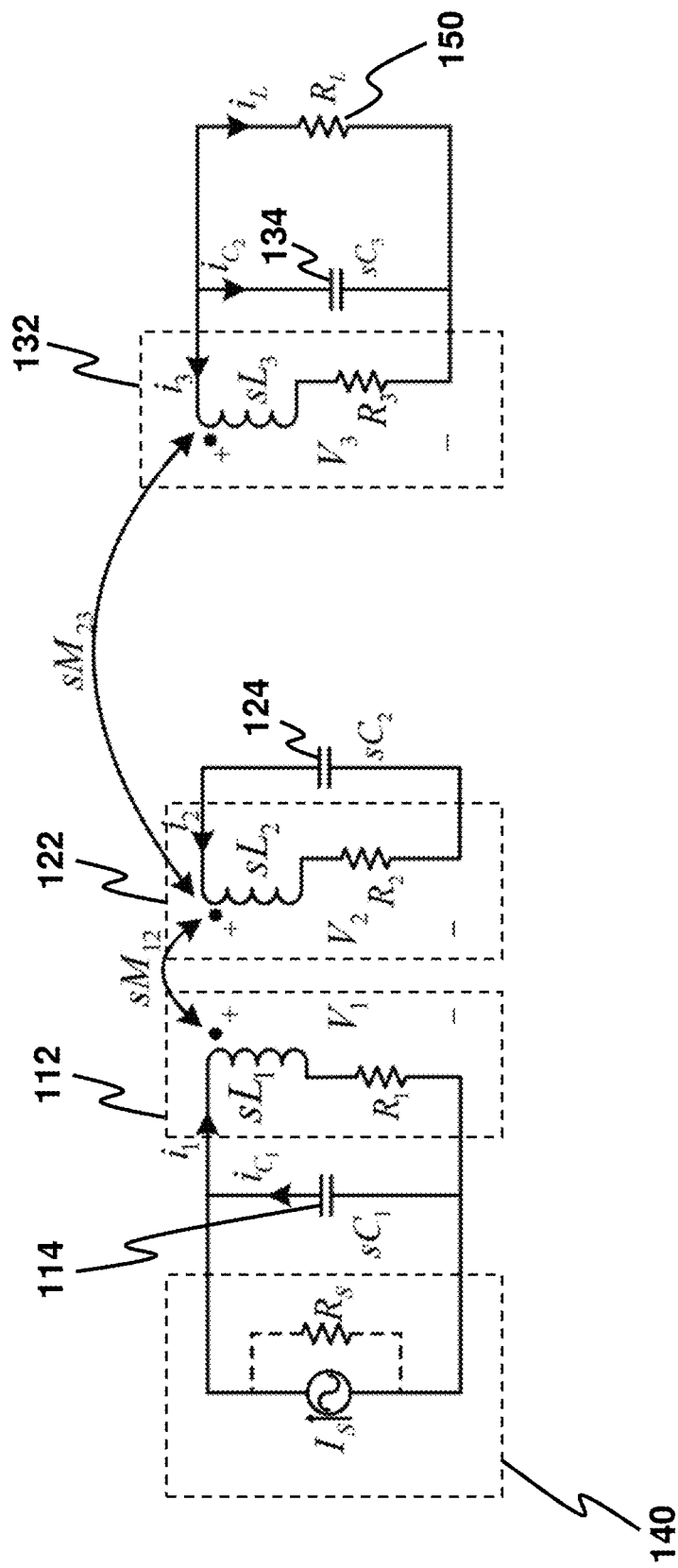
FIG. 2 depicts an equivalent circuit model corresponding to the WPT system shown in FIG. 1.

FIG. 2 shows an equivalent circuit model corresponding to the model shown in FIG. 1. Each of the primary coil 112, the repeater coil 122 and the receiver coil 132 is modeled as a series connection of an inductor and a resistor. Denote ($L_1$, $R_1$), ($L_2$, $R_2$) and ($L_3$, $R_3$) as the ordered pairs, each of which denotes an inductor followed by a resistor, for the primary coil 112, the repeater coil 122 and the receiver coil 132, respectively. Let $C_1$, $C_2$ and $C_3$ be the first, the second and the third resonant capacitors, respectively. The mutual inductance between the primary coil 112 and the repeater coil 122 is denoted as $M_{12}$ while the one between the repeater coil 122 and the receiver coil 132 is denoted as $M_{23}$.

The experiment was performed by considering an example scenario of WPT that a medium power (around 180 W) was wirelessly transferred over a moderately long distance (around 60 cm). This example scenario resembles a situation of an EV wirelessly receiving power from a stationary charging station for battery recharging. In the experiment, the AC power source 140 had a frequency of 860 kHz. This was a relatively low frequency in comparison to a typical frequency commonly employed in WPT (e.g., 9.9 MHz as used in [1]). Using the relatively low frequency has a practical advantage because building the power source 140 that can provide at least a medium-power output would be easier and less costly when compared to using a higher frequency. In the experiment, the primary coil 112, the repeater coil 122 and the receiver coil 132 were substantially circular coils each having a coil radius of 20 cm. Each of the coils was made of wire having a substantially circular cross-section, the cross-section having a radius of about 4 mm. The separation between the repeater coil 122 and the receiver coil 132 was set to be 60 cm, viz., $d_{23}$ 164 given by $d_{23}=60$ cm. The repeater coil 122 was positioned in proximity to the primary coil 112 such that $d_{12}$ 162 was selected to be $d_{12}=16$ cm. The inductors $L_1$, $L_2$ and $L_3$ and the capacitors $C_1$, $C_2$ and $C_3$ were chosen such that the primary resonator 110, the repeater resonator 120 and the receiver resonator 130 had resonant frequencies around 860 kHz.

Figure 3:
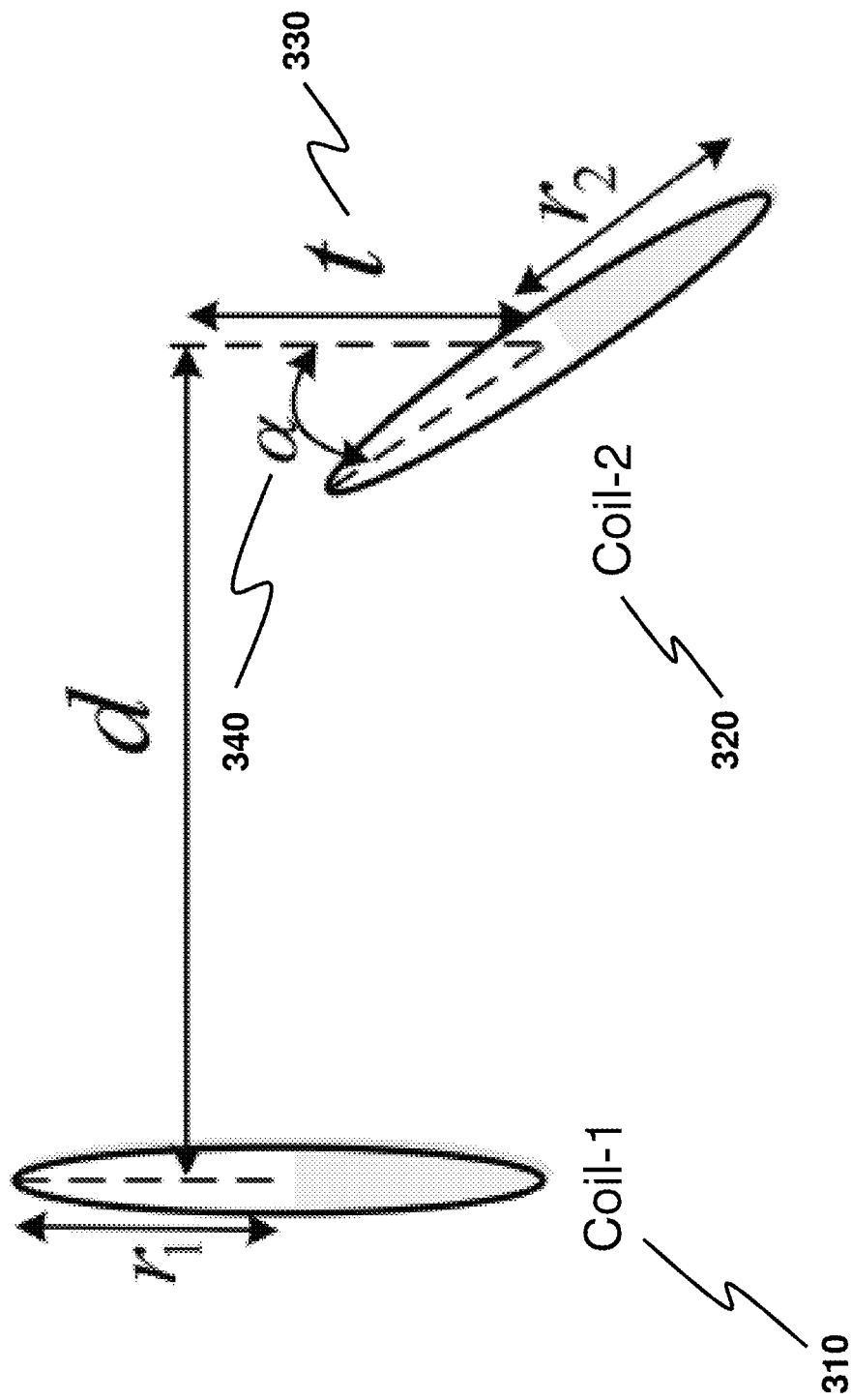
FIG. 3 illustrates axial misalignment and angular displacement between two coils.

The values of $L_1$, $L_2$, $L_3$, $C_1$, $C_2$, $C_3$, $M_{12}$ and $M_{23}$ can be estimated as follows. For a circular coil, the self-inductance can be deduced by $$L = N^{1.9} r \mu_0 \ln(r/a), \qquad \text{EQN. (1)}$$

where N is the number of turns of the coil, r is the radius of the coil, a is the radius of the wire that constructs the coil, and $\mu_0 = 4\pi \times 10^{-7}$ Hm$^{-1}$ is the permeability of free space. With reference to FIG. 3, the mutual inductance, M, between Coil-1 310 and Coil-2 320 is given by $$M = \frac{\mu_0 N_1 N_2}{4\pi} \int_0^{2\pi} \int_0^{2\pi} \frac{r_1 r_2 (\cos\theta\cos\phi + \sin\theta\sin\phi)\cos\alpha \cdot d\theta d\phi}{R_{QN}} \qquad \text{EQN. (2)}$$

in which $$R_{QN} = \sqrt{(r_1\cos\theta - r_2\cos\phi)^2 + (r_1\sin\theta + t - r_2\sin\phi)^2 + d^2} \qquad \text{EQN. (3)}$$

where: $N_1$ and $N_2$ are the numbers of turns of Coil-1 310 and of Coil-2 320, respectively; $r_1$ and $r_2$ are the radii of Coil-1 310 and of Coil-2 320, respectively; d is the separation between Coil-1 310 and Coil-2 320; t is the axial misalignment 330; and α is the displacement angle 340. For a resonator having an inductor of inductance L and a resonant capacitor of capacitance C, the resonant frequency, f, is calculated by $$f = \frac{1}{2\pi\sqrt{LC}}. \qquad \text{EQN. (4)}$$

In each of the primary coil 112, the repeater coil 122 and the receiver coil 132, the number of turns was selected to be 2. Computation gives: $L=4.01$ μH; $L_2=4.01$ μH; $L_3=4.01$ μH; $C_1=9.9$ nF; $C_2=9.9$ nF; $C_3=9.9$ nF; $M_{12}=0.535$ μH (at a distance of 16 cm); and $M_{23}=0.092$ μH (at a distance of 60 cm). After the three coils 112, 122, 132 were made, resistance values of the three coils were measured, giving $R_1=R_2=R_3=0.1\Omega$.

Figure 7:
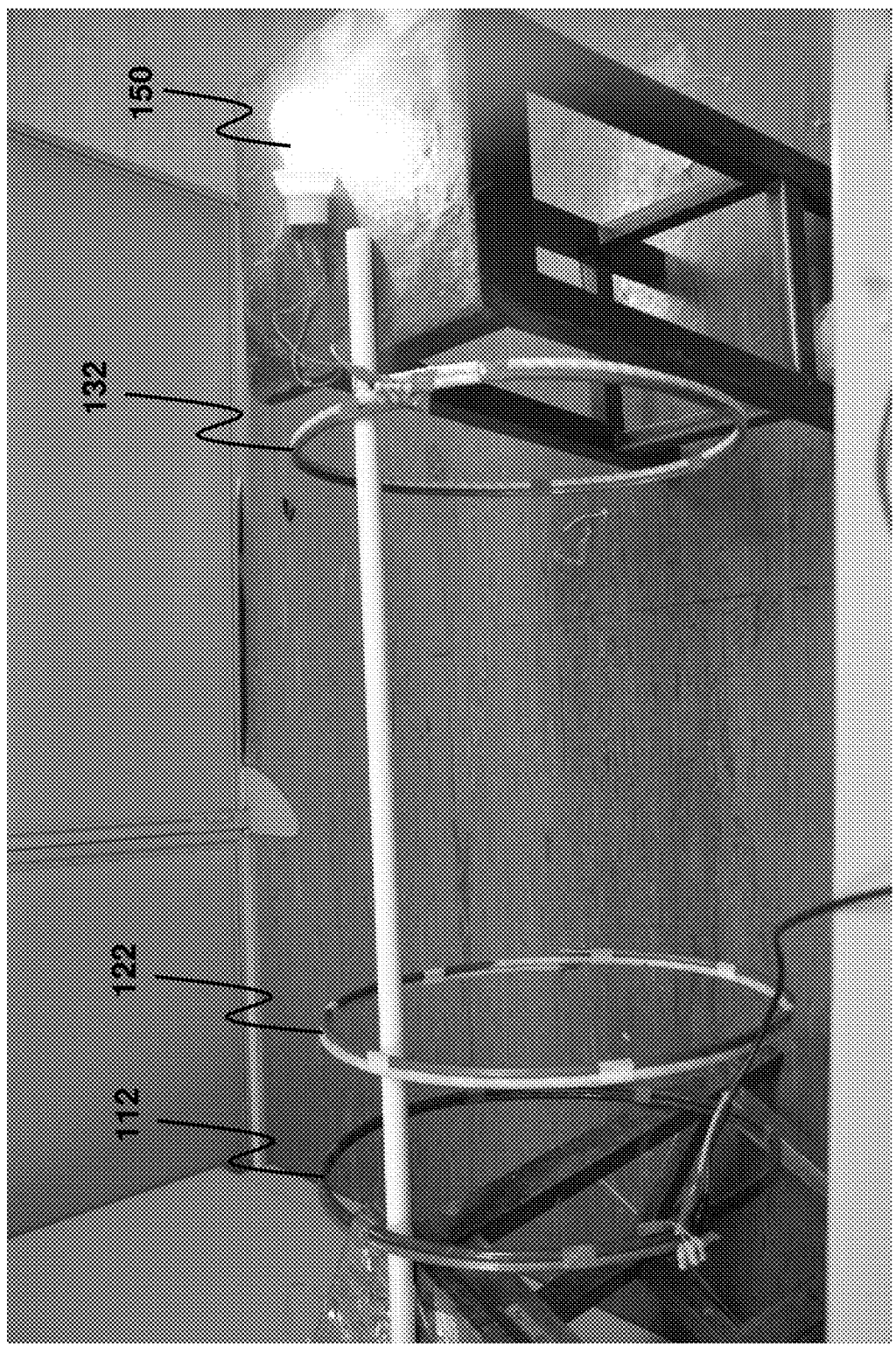
FIG. 7 is a photograph showing an experimental set-up that was used in performing Experiment 1.

The set-up used in the experiment is shown in FIG. 7. In the experimental set-up, the repeater coil 122 was placed in proximity to the primary coil 112. The current and voltage inductively generated across the receiver coil 132 were fed to a light bulb which acted as the load 150. FIG. 7 also shows that the light bulb was lighted up by the received wireless power.

Figure 4:
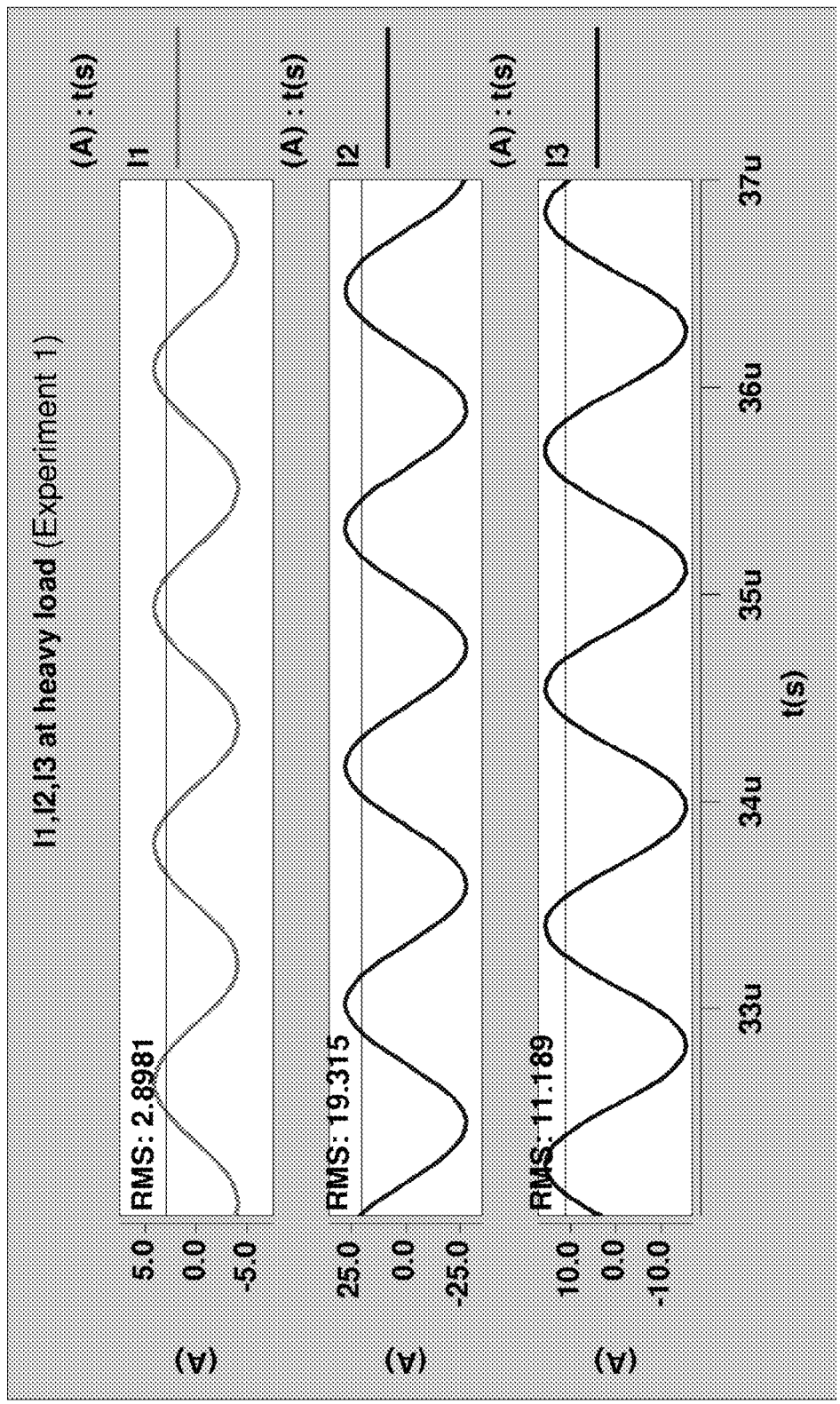
FIG. 4 shows experimental results of Experiment 1 on the waveforms and root-mean-square (RMS) values of the currents flowing in different coils.

FIG. 4 shows experimental results on the currents, $i_1$, $i_2$ and $i_3$, flowing through the primary coil 112, the repeater coil 122 and the receiver coil 132, respectively. The RMS values of $i_1$, $i_2$ and $i_3$ are found to be 2.9 A, 19.3 A and 11.2 A, respectively. Furthermore, a transfer of 180 W of wireless power with 85% power-transfer efficiency was achieved.

The aforementioned results indicate that the presence of the repeater coil 122 is capable of amplifying the current of the primary coil 112. Since a magnetic field produced by the transmitter 102 for WPT is generated by a cascade of the repeater coil 122 and the primary coil 112, the amplification of the current in the primary coil 112 to yield a greater current in the repeater coil 122 leads to a reduced current at the primary coil 112 in a three-coil topology. This insight prompted the Inventors to further investigate a first proposition that a three-coil topology can reduce the current supplied to the primary coil 112 by the power source 140 when compared to a two-coil topology.

B. Experiment 2

To confirm the first proposition, the Inventors conducted a second experiment, based on simulation, for comparing a two-coil topology and a three-coil one. The setting of the parameters and the positional arrangement of the three coils for this three-coil topology were substantially similar to those used in Experiment 1. The two-coil topology used in the experiment was formed simply by removing the repeater coil in the three-coil topology. Three loading conditions were considered, namely, a light-load condition, a medium-load condition and a heavy-load condition.

FIG. 5 contains a table (TABLE 1) that lists the simulated values of RMS currents in the coils of the three- and of the two-coil topologies. It is first noticed that the receiver-coil currents for the two-coil topology are in general close to those for the three-coil topology, indicating that the amounts of power delivered by the two topologies under comparison are similar. As expected, the repeater-coil currents for the three-coil topology under the three loading conditions are substantially greater than the corresponding primary-coil currents. Comparison between the two topologies indicates that, under a given loading condition, the primary-coil current in the three-coil topology is substantially lower than the corresponding one in the two-coil topology. In particular, the data show that the RMS values of the primary-coil currents under the three loading conditions are from 2.74 A to 2.90 A for the three-coil topology while the corresponding primary-coil currents for the two-coil topology are in the range of 13.08 A to 13.50 A. That is, the primary-coil current for the two-coil topology is 4.6 to 4.8 times of the primary-coil current for the three-coil topology.

Refer to FIG. 2. It suggests that $V_1$, the terminal voltage across the primary coil 112 to sustain a primary-coil current, $i_1$, depends on both $i_1$ and $i_2$ where $i_2$ is the current flowing in the repeater coil 122. This observation implies that there could be a possibility that $V_1$ may be reduced due to a reduction in $i_1$. This insight motivated the Inventors to further investigate a second proposition that a reduction in the primary-coil current for the three-coil topology can lead to a reduced $V_1$ when compared to the two-coil topology.

C. Experiment 3

To verify the second proposition, the Inventors conducted a field test for a three-coil topology and a two-coil one. The field test was carried out under the condition that the delivered power levels at the receivers of both the three- and the two-coil topologies are approximate and close. Then $V_1$, $V_2$ and $V_3$ were measured, where $V_2$ and $V_3$ denote the terminal voltages across the repeater coil and across the receiver coil, respectively. For the three-coil topology, the distance between the repeater coil and the receiver coil was set to be 30 cm and the distance between the repeater coil and the primary coil was 12 cm. For the two-coil topology, the primary coil was separated from the receiver coil by 30 cm. Regardless of whether the two- or the three-coil topology was tested, $V_3$ was first rectified to DC and then fed to a resistive load of 400Ω.

FIG. 6 includes a table (TABLE 2) that lists the values of RMS voltages measured at terminals of the coils in the three- and of the two-coil topologies, together with the levels of power absorbed by the load. It is apparent that under the condition of delivering approximately the same power level, the three-coil topology has a RMS terminal voltage across the primary coil (viz., 16.3V) significantly lower than the corresponding RMS terminal voltage for the two-coil topology (namely, 114V). That is, the RMS terminal voltage across the primary coil of the three-coil topology is only about 1/7 of that of the two-coil topology.

Since the terminal voltage of the primary coil is significantly reduced for the three-coil topology, the demand on the power source for providing a sufficiently high voltage output to supply the terminal voltage to the primary coil is relaxed. It follows that occurrence of voltage stress at the power source is much less likely by using the three-coil topology than using the two-coil one. This finding leads to the development of the present invention that follows.

D. The Present Invention

A first aspect of the present invention is to provide a power-transmitting unit configured to wirelessly transmit power and a WPT system employing the power-transmitting unit. The power-transmitting unit and the WPT system as disclosed herein provide an advantage of discouraging occurrence of voltage stress at a power source.

The disclosed power-transmitting unit and the WPT system are described with an aid of FIG. 1, which depicts a WPT system according to an exemplary embodiment of the present invention. A WPT system 100 comprises a power-transmitting unit 102 and a power-receiving unit 104. The power-receiving unit 104 is configured to obtain wireless power from the power-transmitting unit 102 by receiving a magnetic field provided by the power-transmitting unit 102 and inductively generating a voltage and a current from the magnetic field. It is possible that instead of having only one power-receiving unit, the WPT system may have plural units each of which is a realization of the power-receiving unit 104.

The power-transmitting unit 102 comprises an AC power source 140 and a primary resonator 110. The primary resonator 110, comprising a primary coil 112, preferably is realized by having a first resonant capacitor 114 connected in parallel with the primary coil 112. Furthermore, the primary resonator 110 is electrically coupled to the power source 140 such that a primary-coil current flows through the primary coil 112 when the primary resonator 110 is excited by the power source 140. The power-transmitting unit 102 further comprises a repeater resonator 120 that includes a repeater coil 122. Preferably, the repeater resonator 120 is realized by connecting two terminals of the repeater coil 122 with a second resonant capacitor 124. In addition, the repeater coil 122 is end-to-end adjacent to the primary coil 112. As used herein in the specification and the appended claims, a first coil being "end-to-end adjacent" to a second coil, where each of the first and the second coils appears in a form of a loop or a cylinder having two end faces, means that one end face of the first coil is positioned adjacent to, and faces, an end face of the second coil. The repeater resonator 120 is electrically isolated from the power source 140 so that the power source 140 is not required to provide a voltage to drive the repeater resonator 120. In practice, electrical isolation between the repeater resonator 120 and the power source 140 is achievable by physically isolating the repeater resonator 120 from both the primary resonator 110 and the power source 140. In particular, the repeater coil 120 and the primary coil 112 are separated by a distance selected, and the repeater coil 122 is configured to, amplify the primary-coil current. The primary-coil current is amplified in a sense that a repeater-coil current flowing through the repeater coil 122 is inductively generated by the primary-coil current and that the repeater-coil current so generated is substantially greater than the primary-coil current. As a result, when it is desired to wirelessly transmit power, the power-transmitting unit 102 is enabled to generate a magnetic field for WPT with contribution from both the primary-coil current and the repeater-coil current but the power source 140 is not required to provide a terminal voltage across the repeater coil 122 to sustain the receiver-coil current. Note that in general, the magnetic field is mainly contributed by the repeater coil 122. The power source 140 is only required to provide a terminal voltage across the primary coil 122 to sustain the primary-coil current, which is substantially lower than the repeater-coil current. It leads to an advantage that occurrence of voltage stress at the power source 140 is discouraged.

Preferably, the first resonant capacitor 114 and the second resonant capacitor 124 are selected and configured such that the primary resonator 110 and the repeater resonator 120 are substantially similar in resonant frequency. It is also preferable and desirable that resonant frequencies of the primary resonator 110 and of the repeater resonator 120 are substantially close to an operating frequency of the power source 140 in providing an AC voltage to the primary resonator 110. In medium- and high-power WPT applications, a low operating frequency is preferred in order that the power source 140 can be realized with a reduced cost. According to the Inventors' investigation for medium- and high-power applications, one preferable range of frequency within which the operating frequency may be chosen from is 100 kHz to 1 MHz.

The power-receiving unit 104 comprises a receiver resonator 130. The receiver resonator 130 comprises a receiver coil 132 configured to receive the magnetic field from the power-transmitting unit 102 so as to generate a receiver-coil current that flows through the receiver coil 132 for feeding to a load 150. Preferably, the primary resonator 110, the repeater resonator 120 and the receiver resonator 130 are substantially similar in resonant frequency. Since the receiver resonator 130 is desired to be inductively coupled to the magnetic field generated from the power-transmitting unit 102, it is preferable and advantageous that the receiver resonator 130 has a resonant frequency substantially close to the operating frequency of the power source 140. In a commonly used configuration, the receiver resonator 130 has a third resonant capacitor 134 connected in parallel to the receiver coil 132, whereby the resonant frequency of the receiver resonator 130 is determined by the capacitance value of the third resonant capacitor 134 and the inductance value of the receiver coil 132 according to EQN. (4).

The Inventors' investigation has revealed that it is preferable to have the repeater coil 122 positioned such that the selected distance between the repeater coil 122 and the primary coil 112 (namely, $d_{12}$ 162) is limited to be at most one third of a distance between the primary coil 112 and the receiver coil 132 (viz., $d_{13}$ 166).

With reference to the power-transfer efficiency achieved and the amount of wireless power transferred by the experimental set-up as mentioned above in Experiment 1, it is desirable that the WPT system 100 can achieve a transfer efficiency greater than 85% when the repeater coil 122 and the receiver coil 132 are separated by a distance $d_{23}$ 164 of 0.6 m. It is also desirable that the WPT system 100 can achieve wireless transfer of at least 180 W of power from the power-transmitting unit 102 to the power-receiving unit 104.

In one option, the power-receiving unit 104 may further comprise one or more rectifiers in order to rectify AC power provided by the receiver-coil current to direct-current (DC) power before feeding to the load 150. In WPT applications related to EVs, the load 150 may be one or more batteries configured to receive the DC power for recharging.

For WPT targeting for high power-transfer efficiency, it is desirable that the power-transmitting unit 102 and the power-receiving unit 104 are arranged such that the repeater coil 122 and the receiver coil 132 are axially substantially-aligned without a substantial angular displacement. Concepts of being not axially substantially-aligned and having an angular displacement are illustrated with an aid of FIG. 3. In FIG. 3, a Coil-1 310 and a Coil-2 320 are not axially substantially-aligned such that an axial misalignment 330 is present. In addition, an end face of the Coil-1 310 and an end face of the Coil-2 320 are not substantially in parallel to each other so that a displacement angle 340 exists. In practice, it may be costly to keep the two coils 122, 132 well aligned without any substantial angular displacement. If certain degradation such as a reduced power-transfer efficiency is acceptable in some applications, the repeater coil 122 and the receiver coil 132 may be relaxed from being axially substantially-aligned, or an angular displacement between the two coils 122, 132 may be present.

A second aspect of the present invention is to provide a method for wirelessly transmitting power from a transmitting side to a receiving side. The disclosed method is realizable by the WPT system as disclosed above in the first aspect of the present invention. As such, FIG. 1 is used again for detailing the disclosed method. The transmitting side has a primary resonator 110, a repeater resonator 120 and an AC power source 140. The primary resonator 110 comprises a primary coil 112, and the repeater resonator 120 comprises a repeater coil 122. The receiving side has a receiver resonator 130 which comprises a receiver coil 132.

The method comprises positioning the primary coil 112 to be end-to-end adjacent to the repeater coil 122, and electrically isolating the repeater resonator 120 from the power source 140. Preferably, the repeater resonator 120 is electrically isolated from the power source 140 by physically isolating the repeater resonator 120 from both the primary resonator 110 and the power source 140. In the method, the power source 140 excites the primary resonator 110 to generate a primary-coil current flowing through the primary coil 112. The method further comprises selecting a distance between the repeater coil 122 and the primary coil 112 such that the primary-coil current inductively generates a repeater-coil current that flows through the repeater coil 122 and that is substantially greater than the primary-coil current. As a consequence, the transmitting side is enabled to generate a magnetic field with contribution from both the primary-coil current and the repeater-coil current while the power source is not required to provide a terminal voltage across the repeater coil 122 to sustain the repeater-coil current, which is a current substantially greater than the primary-coil current. In general, the magnetic field is mainly contributed by the repeater coil 122. It follows that occurrence of voltage stress at the power source 140 is discouraged. The method additionally comprises receiving the magnetic field by the receiver coil 132 so as to inductively generate a receiver current that flows through the receiver coil 132 for feeding to a load 150 at the receiving side.

Preferably, the primary resonator 110, the repeater resonator 120 and the receiver resonator 130 have substantially-similar resonant frequencies. As mentioned above, the selected distance between the repeater coil 122 and the primary coil 112, i.e. $d_{12}$ 162, is preferably limited to be at most one third of a distance between the primary coil 112 and the receiver coil 132, viz., $d_{13}$ 166. It is also mentioned above that AC power provided by the power source 140 may be chosen from a range from 100 kHz to 1 MHz. The Inventors believe that this range of operating frequency is suitable for medium- and high-power applications of WPT. It is desirable that using the disclosed method can achieve a transfer efficiency greater than 85% when the repeater coil 122 and the receiver coil 132 are separated by a distance $d_{23}$ 164 of 0.6 m. It is also desirable if a power of at least 180 W can be wirelessly transferred by using the method disclosed herein.

Optionally, the method further comprises rectifying, at the receiver side, AC power provided from the receiver-coil current to DC power before feeding to the load 150. In EV applications, the rectified DC power may be used for recharging one or more batteries installed in an EV that receives wireless power.

E. Remarks

The use of three-coil topologies for WPT has been discussed and investigated in [10]-[15]. The present invention herein further advances the state of the art from [10]-[15] by disclosing a feature of amplifying a primary-coil current by inductively generating a repeater-coil current that is substantially greater than the primary-coil current so that a magnetic field for WPT is generated with contribution from both the primary-coil current and the repeater-coil current while a power source is not required to provide a terminal voltage across a repeater coil to sustain the receiver-coil current to thereby discourage occurrence of voltage stress at the power source.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A wireless power transfer system comprising a power-transmitting unit and a power-receiving unit, the power-transmitting unit being configured to wirelessly transmit power in the wireless power transfer system, wherein:
   the power-transmitting unit comprises:
     an alternating-current (AC) power source;
     a primary resonator comprising a primary coil, the primary resonator being electrically coupled to the power source such that a primary-coil current flows through the primary coil when the primary resonator is excited by the power source; and
     a repeater resonator comprising a repeater coil end-to-end adjacent to the primary coil, the repeater resonator being electrically isolated from the power source, wherein the repeater coil and the primary coil are separated by a distance selected, and the repeater coil is configured, to amplify the primary-coil current by inductively generating a repeater-coil current that flows through the repeater coil and that is substantially greater than the primary-coil current;
   so that when wirelessly transmitting the power, the power-transmitting unit generates a magnetic field for wireless power transfer with contribution from both the primary-coil current and the repeater-coil current while the power source is not required to provide a terminal voltage across the repeater coil to sustain the repeater-coil current, which is a current substantially greater than the primary-coil current, thereby discouraging occurrence of voltage stress at the power source;
   the power-receiving unit comprises a receiver resonator, the receiver resonator comprising a receiver coil configured to receive the magnetic field so as to inductively generate a receiver-coil current that flows through the receiver coil for feeding to a load; and
   the repeater coil is positioned such that the selected distance between the repeater coil and the primary coil is at most one third of a distance between the primary coil and the receiver coil.

2. The power-transmitting unit of claim 1, wherein the primary resonator has a resonant frequency substantially similar to the repeater resonator's resonant frequency.

3. The power-transmitting unit of claim 1, wherein the power source is configured to provide AC voltage having a frequency in the range from 100 kHz to 1 MHz.

4. The wireless power transfer system of claim 1, wherein the primary resonator, the repeater resonator and the receiver resonator have substantially-similar resonant frequencies.

5. The wireless power transfer system of claim 1, wherein a transfer efficiency achieved by the wireless power transfer system is greater than 85% when the repeater coil and the receiver coil are separated by a distance of 0.6 m.

6. The wireless power transfer system of claim 1, wherein power wirelessly transferred from the power-transmitting unit to the power-receiving unit is at least 180 W.

7. The wireless power transfer system of claim 1, wherein the power-receiving unit further comprises one or more rectifiers such that AC power provided from the receiver-coil current is rectified to direct-current (DC) power before feeding to the load.

8. The wireless power transfer system of claim 7, wherein the load is one or more batteries configured to receive the DC power for recharging.

9. The wireless power transfer system of claim 1 wherein the power-transmitting unit and the power-receiving unit are arranged such that the repeater coil and the receiver coil are relaxed from being axially substantially-aligned.

10. The wireless power transfer system of claim 1, wherein the power-transmitting unit and the power-receiving unit are arranged such that an angular displacement between the repeater coil and the receiver coil is present.

11. A method for wirelessly transmitting power from a transmitting side to a receiving side, the transmitting side having a primary resonator, a repeater resonator and an alternating-current (AC) power source, the primary resonator comprising a primary coil, the repeater resonator comprising a repeater coil, the receiving side having a receiver resonator which comprises a receiver coil, the method comprising:
   positioning the primary coil to be end-to-end adjacent to the repeater coil;
   electrically isolating the repeater resonator from the power source;
   exciting the primary resonator by the power source to generate a primary-coil current flowing through the primary coil;
   selecting a distance between the repeater coil and the primary coil such that the primary-coil current inductively generates a repeater-coil current that flows through the repeater coil and that is substantially greater than the primary-coil current, so that the transmitting side is enabled to generate a magnetic field with contribution from both the primary-coil current and the repeater-coil current while the power source is not required to provide a terminal voltage across the repeater coil to sustain the repeater-coil current, which is a current substantially greater than the primary-coil current, to thereby discourage occurrence of voltage stress at the power source, wherein the selected distance between the repeater coil and the primary coil is at most one third of a distance between the primary coil and the receiver coil; and receiving the magnetic field by the receiver coil so as to inductively generate a receiver current that flows through the receiver coil for feeding to a load at the receiving side.

12. The method of claim 11, wherein the primary resonator, the repeater resonator and the receiver resonator have substantially-similar resonant frequencies.

13. The method of claim 11, wherein the power source is configured to provide AC voltage having a frequency in the range from 100 kHz to 1 MHz.

14. The method of claim 11, wherein a transfer efficiency in wirelessly transmitting power from the transmitting side to the receiving side is greater than 85% when the repeater coil and the receiver coil are separated by a distance of 0.6 m.

15. The method of claim 11, wherein power wirelessly transferred from the transmitting side to the receiving side is at least 180 W.

16. The method of claim 11, further comprising:
rectifying, at the receiver side, AC power provided from the receiver-coil current to direct-current (DC) power before feeding to the load.

* * * * *